INVENTOR.
HERSEY W. YOUNG, JR.
BY Bertha L. MacGregor
ATTORNEY

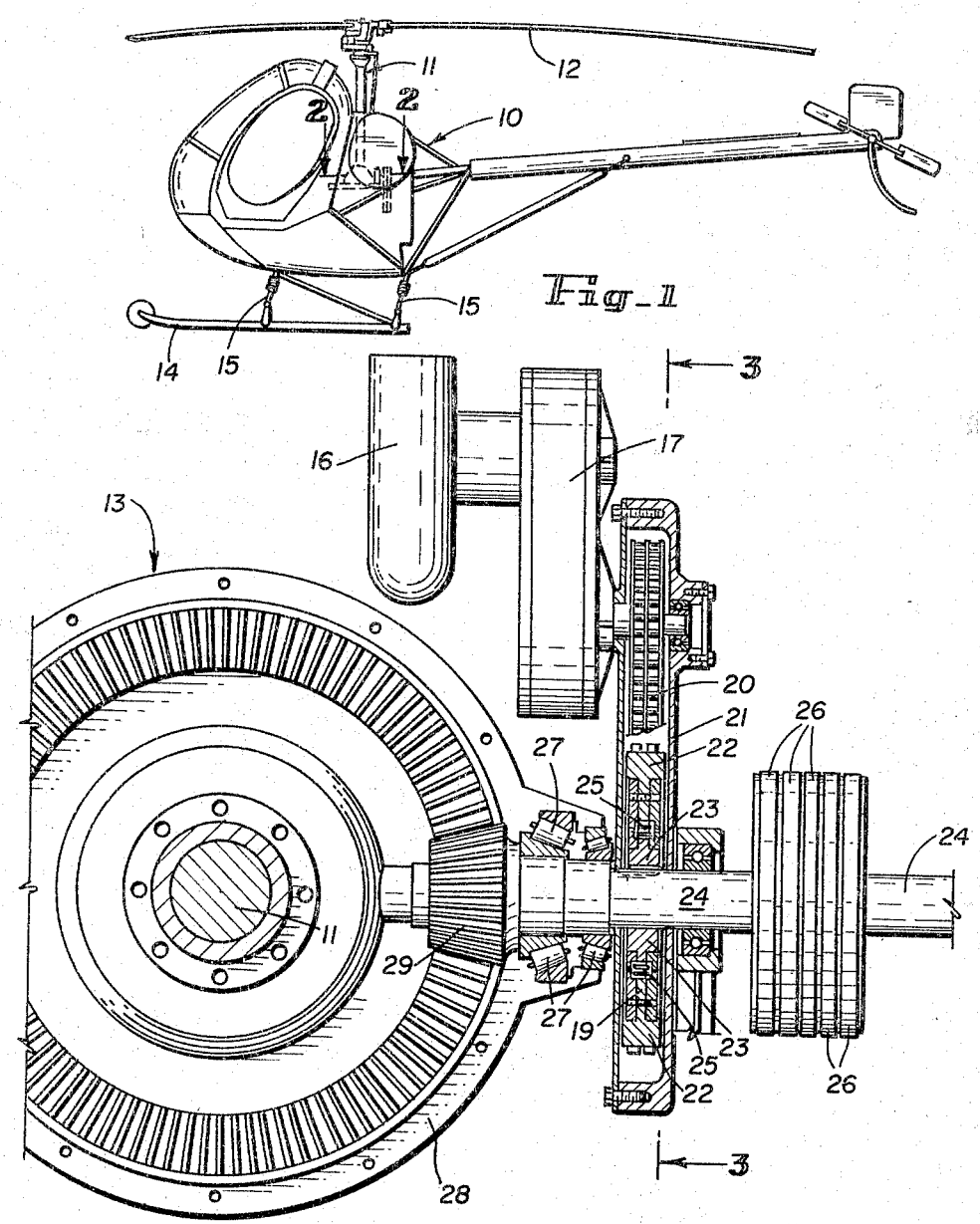

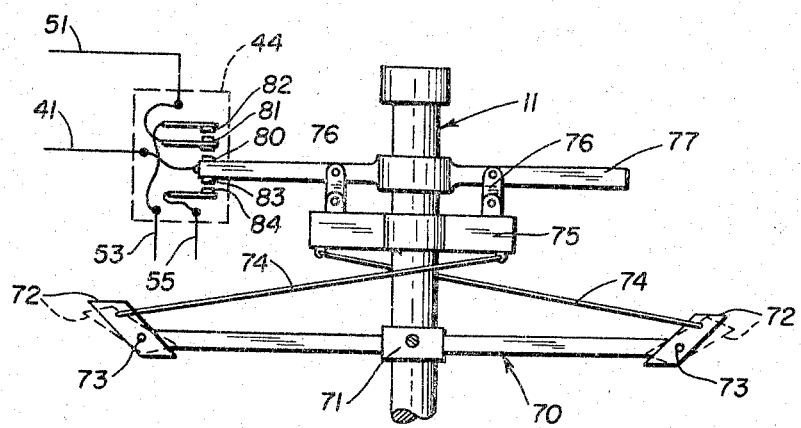
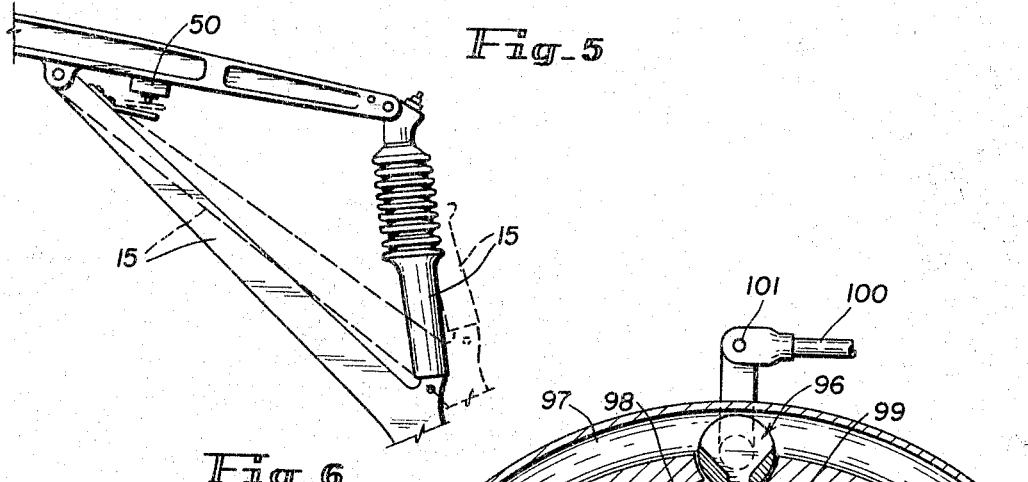
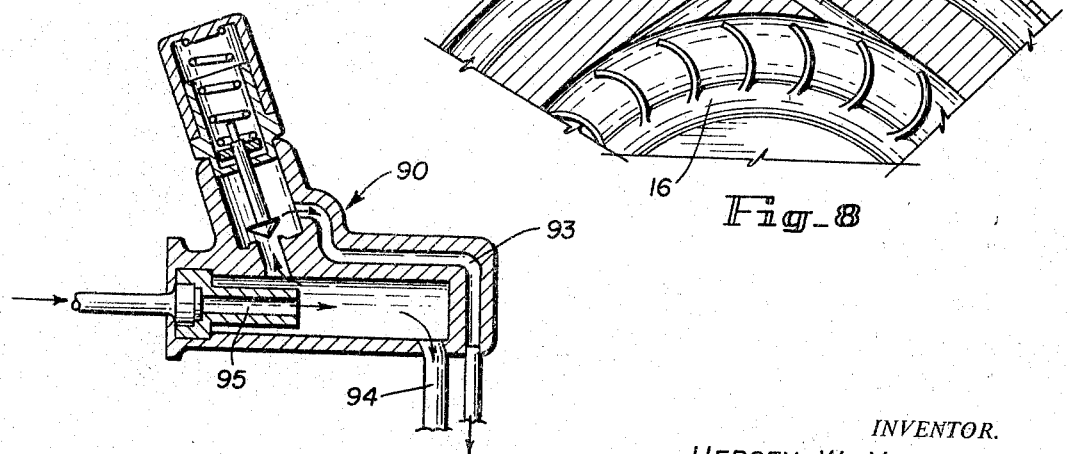

United States Patent Office 3,325,122
Patented June 13, 1967

3,325,122
HELICOPTER
Hersey W. Young, Jr., Lakewood, Colo.
(11260 W. 77th Drive, Arvada, Colo. 80002)
Filed Aug. 18, 1965, Ser. No. 480,680
15 Claims. (Cl. 244—17.13)

This invention relates to helicopters and more particularly to a helicopter provided with a main engine for driving the rotor shaft and with an auxiliary engine and control system therefor. The auxiliary engine shown and described herein may serve in lieu of the main engine in the event of engine failure or as an aid or addition to the main engine under certain conditions. Therefore the term "auxiliary engine" used herein is intended to include an engine whose function is both auxiliary and supplementary.

The main object of the invention is to provide means in a helicopter which will give the pilot additional time to select a landing area in the event of a total or partial primary power failure. Another object is to provide means to supplement the primary power source to meet emergency power requirements.

The advantages achieved by the invention are increased safety and economics through reduction in cost of insurance, increased sales appeal, and increased operational areas previously restricted by safety standards, insurance and other factors.

Another object of the invention is to provide an auxiliary engine of the turbine type in which solid fuel may be employed for operating the engine. Solid fuels are smaller in volume and lighter in weight than liquid fuels suitable for this purpose, and provide an added safety factor in that they cannot be ignited except under pressure. Further, solid fuels can be designed for different burning-time formulas, whereby the operation of the auxiliary engine is controlled by the solid fuel chosen according to its duration of burning time and power requirements.

The control system for the auxiliary engine preferably is rendered operative by the automatic closing of a micro switch actuated by the landing gear of the helicopter when the latter leaves the ground. Thus the control system can function only when the helicopter is in flight. The landing gear micro switch is automatically opened when the helicopter is on the ground, thereby putting the auxiliary engine generator igniter plug out of circuit.

The control system may be manually activated by the pilot, when the helicopter is in flight, through a switch located in the helicopter cabin. The manual switch is equipped with a safety lock to prevent inadvertent firing.

When the control system has been rendered operative by the closing of a main switch and the micro switch, the activation of the auxiliary engine depends on the rotor transmission r.p.m. If the rotor r.p.m. drops to a predetermined low r.p.m. limit, a red warning light will warn the pilot of that fact. If the pilot makes adjustments and increases the rotor transmission rp.m., the warning light will go out. If the pilot fails to heed the warning light and takes no corrective action, or if he cannot effect a correction, and the rotor speed decreases below the red line limit (red line limits are set by the manufacturer for safe operation), an r.p.m. switch in the control system activates the auxiliary engine and the helicopter r.p.m. will be increased to the normal operating speed by the operation of the auxiliary engine which in this embodiment is a turbine engine.

In the drawings:

FIG. 1 is an elevational side view of a helicopter embodying my invention.

FIG. 2 is a horizontal sectional view, on an enlarged scale, in the plane of the line 2—2 of FIG. 1.

FIG. 5 is a diagrammatic view of the r.p.m. selector switch and mechanism associated with the rotor shaft for actuating the switch.

FIG. 6 is an elevational view of the micro switch mounted on the helicopter and of part of the landing gear in two positions whereby the micro switch is closed when the helicopter is in flight and open when on the ground.

FIG. 7 is a sectional view of one type of by-pass valve which may be part of the control system.

FIG. 8 shows diagrammatically another type of valve which may be used in place of a by-pass valve to throttle the auxiliary engine.

Figure 3:
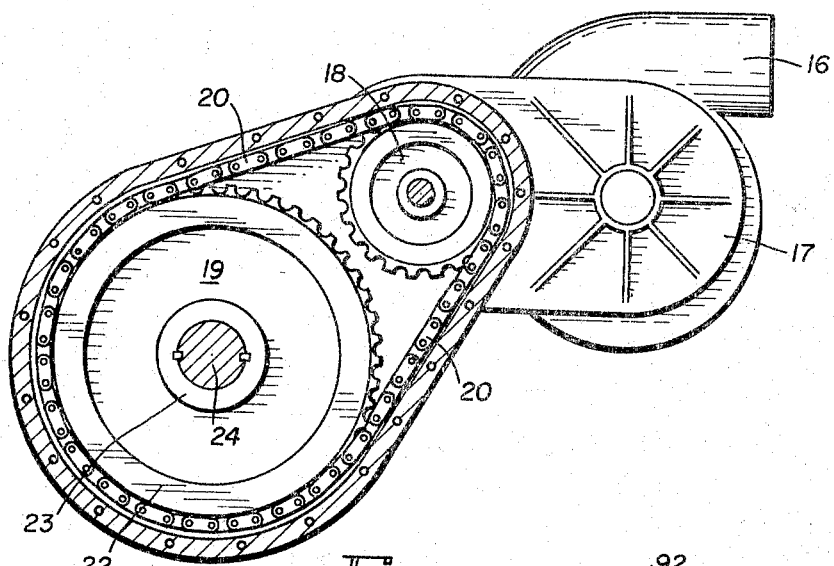
FIG. 3 is a vertical sectional view in the plane of the line 3—3 of FIG. 2.

In that embodiment of the invention shown in the drawings, the helicopter 10 comprises a rotor shaft 11, rotor 12, and transmission 13. The landing gear includes runners 14 and struts 15. Other conventional parts of the helicopter need not be described.

The auxiliary turbine engine 16 is operatively connected to the rotor transmission 13 through reduction gearing in the gear housing 17, and sprocket wheels 18, 19 connected by chain 20 in housing 21. The outer race of the sprocket wheel 19 is indicated at 22 and the inner race at 23. The inner race 23 of the sprocket wheel 19 is fixedly mounted on the pinion shaft 24 to turn therewith, and the outer race which serves as the chain sprocket is stationary during normal flight operation. When the turbine engine is activated, the chain 20 moves the outer race 22 of the sprocket 19 until it reaches the speed of the inner race 23 and the one way clutch 25 is engaged.

The pinion shaft 24 is driven by belt drive 26 from the main engine (not shown) located below the shaft 24. The shaft 24 extends through bearings 27 mounted in the transmission housing 28. A pinion 29 fixed on the end of the shaft 24 meshes with rotor transmission 13 which drives the rotor shaft 11. The shaft 24 is referred to herein as the transmission driving shaft and the shaft 11 as the driven rotor shaft.

Thus in normal flight the transmission of the primary power is from the main engine (not shown) through belts 26 to pinion shaft 24, pinion 29, transmission 13 to rotor shaft 11.

Figure 4:
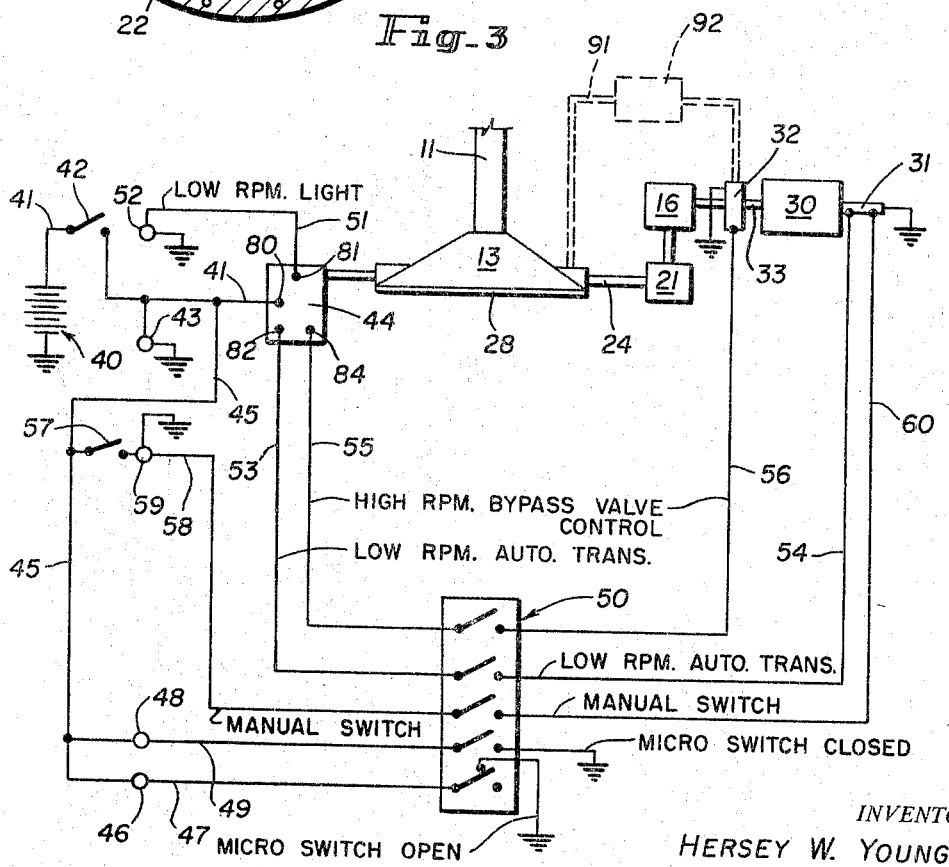
FIG. 4 is a diagrammatic view of the auxiliary engine and its operative connections to the rotor transmission, together with the control system therefor.

The auxiliary engine 16 is fueled by a gas generator 30 provided with an igniter plug 31 (FIG. 4). A by-pass valve 32 is located in the conduit 33 which connects the gas generator 30 to the auxiliary engine 16. When the turbine engine is activated, the power transmission is from the engine 16 through the gearing in housing 17 to sprocket 18, by chain 20 to sprocket 19, through clutch 25 in housing 21 to pinion shaft 24, pinion 29, transmission 13 to rotor shaft 11. The function of the by-pass valve 32, when open, as hereinafter explained, is to throttle the gas supply from the generator 30 to the engine 16.

Referring to FIG. 4, the electrical system which controls the operation of the auxiliary engine 16 comprises the following described switches, signal lights and circuits:

Battery 40 is connected through line 41 to master manual switch 42, signal light 43, to r.p.m. selector switch 44, and through line 45 to micro switch open panel light indicator 46 in line 47, and to closed panel light indicator 48 in line 49, to micro switch 50. Selector switch 44 is connected through line 51 to low r.p.m. warning light 52. Switch 44 also is connected through low r.p.m. automatic transmission line 53 through micro switch 50 to line 54 to igniter plug 31 on gas generator 30. The selector switch 44 also is connected through high r.p.m. by-pass valve control line 55 through micro switch 50 and line 56 to by-pass valve 32. An alternate means for operating the by-pass valve 32 will be described hereinafter.

A manually operable switch 57 is connected to line 45 and through line 58 to manual switch "on" panel light 59 through micro switch 50, and line 60 to igniter plug 31 on gas generator 30.

By manual closing of the master switch 42, all circuits from the switch 42 to the micro switch 50 and to the r.p.m. selector switch 44 are energised from the battery 40. Activation of the auxiliary engine is automatically controlled by the r.p.m. selector switch 44 which is operated mechanically by the helicopter rotor shaft 11. The r.p.m. selector switch 44 has three functions: first, when the rotor 11 r.p.m. approaches a predetermined lower red line limit, the selector switch 44 makes connection with the low r.p.m. warning light 52. Second, if the rotor r.p.m. continues to decrease and drops below the predetermined limit, the selector switch 44 makes connection with the igniter 31 which activates the gas generator 30 which supplies gas through the safety by-pass valve 32 to the auxiliary engine 16 connected by chain drive 20 and clutch 25 in housing 21 to the helicopter drive pinion shaft 24 and pinion 29 which drives the transmission 13. Third, if the helicopter rotor r.p.m. is beyond the predetermined high r.p.m. red line limits, the selector switch 44 connects to the circuit which operates a solenoid (not shown) and opens the safety by-pass valve 32, whereby the gas supply from generator 30 to auxiliary engine 16 is reduced until the helicopter rotor r.p.m. has returned to normal operating limits.

All of the electrical control circuits go through the landing gear micro switch 50, and since that switch 50 is open when the helicopter is not in flight, the igniter plug 31 cannot be ignited when the helicopter is on the ground. The "safe" condition is indicated by the panel light 46 which will be "on" when the circuit is open. When the helicopter leaves the ground, the micro switch 50 closes and then the circuits are activated, as indicated by panel light 48. The manual switch 57 can activate the control system when the helicopter is in flight and the micro switch 50 is closed. If the helicopter is on the ground the micro switch 50 is open, the manual switch 57 will only turn on the light 59, indicating that the circuit is working.

FIG. 5 shows diagrammatically the mechanism for actuating the r.p.m. selector switch 44. The switch is controlled by the rotational speed of the rotor shaft 11. A cross bar 70, fixed to the shaft by collar 71, carries weights 72 pivotally mounted on the cross bar 70 by pins 73. The upper ends of the weights 72 are attached by rods 74 to collar 75 slidably mounted on the shaft 11. The collar 75 is connected by links 76 to contact carrying arm 77 slidably mounted on shaft 11.

Under influence of centrifugal force, the weights 72 move pivotally upwardly and inwardly when the rotary speed of the shaft 11 decreases, thereby raising the collar 75 and contact carrying arm 77. The initial upward movement of the arm 77 causes contact 80 connected in line 41 to engage contact 81 in line 51 causing low r.p.m. light 52 to go on. Continued upward movement of the arm 77 due to decreasing r.p.m. of the shaft 11 causes contacts 80 and 81 to move upwardly and make contact with contact 82 in line 53 through closed micro switch 50 to line 54 to igniter 31, whereby auxiliary engine 16 is activated.

When the rotary speed of the shaft 11 increases beyond a predetermined limit, the collar 75 and arm 77 are lowered by the movement of the weights 72 downwardly and outwardly, and then contact 83 on the contact arm 77 makes contact with contact 84 in high r.p.m. circuit 55–56 to by-pass valve 32.

Instead of using the electrical control circuit consisting of the switch contact 84, line 55, micro switch 50 and line 56 to the by-pass valve 32, an r.p.m. governor controlled by the speed of the rotor shaft 11 may be substituted. This has been diagrammatically indicated in FIG. 4 by the broken line 91 connecting the r.p.m. governor 92 to the by-pass valve 32 and transmission 13. The governor 92 may be powered by a flexible coupling or pad from the transmission 13.

The by-pass valve 32 may be of the type shown in FIG. 7 or in FIG. 8. FIG. 7 shows a torque control valve 90 which is suitable for use with a solid fuel turbine engine 16. This valve ports hot gas directly to the turbine through hot gas nozzles 93, 94, flowing through intake 95 from the solid fuel cartridge (not shown). The valve by-passes the hot gas nozzle as the pressure rises above a preset maximum. Therefore the pressure of the gas within the hot gas circuit is maintained at optimum level.

The valve 96 shown in FIG. 8 is a throttle control valve which directs hot gases to the turbine 16 in one of two directions from the gas manifold 97. For normal operation of the turbine the gases pass through the normal jet 99. When the r.p.m. of the rotor exceeds a predetermined limit, the valve 96 directs the gases through the governor jet 98 to thereby throttle the turbine operation but without loss of pressure which might result if the excess gases were exhausted overboard. An operating lever 100 connected to governor 92 is pivotally connected at 101 to the valve 96.

As explained in connection with the diagrammatically shown by-pass valve 32, in FIG. 4, the valves shown in FIGS. 7 and 8 may be electrically operated by being connected in the circuit 55–56, or mechanically connected to the governor 92 which is controlled by the rotor shaft r.p.m.

An example of solid fuel which may be employed to power the turbine 16 is the propellant type, ammonium nitrate composite or other, prepared for a three minute formula, propellant weight 22.848 lbs. per minute. The grain type may be double end burner, case O.D. 10 inches, grain O.D. 9⅞ cast in tube, grain length 6".

Fuel prepared for a three minute burning formula provides the pilot with the time needed for locating a suitable landing area in the event of primary power failure. Since solid fuel continues to burn for a time predetermined in the production of the fuel, the by-pass valve is provided as the means for throttling the gas production and by-passing the gas to get rid of the excess when not required for fueling the auxiliary engine 16.

I claim:
1. In a helicopter comprising a rotor, a rotor shaft, a main engine, and gearing between the main engine and rotor shaft including a transmission driving shaft and a transmission, the improvement which comprises
   (a) an auxiliary engine provided with a gas generator and igniter,
   (b) gearing connecting the auxiliary engine and the transmission driving shaft,
   (c) an electrical control system connected to a source of electrical energy and to the auxiliary engine gas generator igniter,
   (d) means automatically energizing the control system when the helicopter is in flight, and
   (e) means automatically activating the igniter when the r.p.m. of the rotor falls below a predetermined limit to thereby cause the auxiliary engine to transmit rotary motion to the transmission driving shaft.
2. The improvement in a helicopter defined by claim 1, in which the auxiliary engine is a turbine powered by solid fuel.
3. The improvement in a helicopter defined by claim 1, in which the gearing connecting the auxiliary engine and the transmission driving shaft comprises a pair of sprocket wheels, a chain drivingly connecting said wheels, one of the sprocket wheels having an outer race and an inner race, the inner race being fixed on the transmission driving shaft, and a one way clutch drivingly connecting said inner and outer races when the auxiliary engine has been activated and the speed of rotation of the outer race reaches the speed of the inner race.

4. The improvement in a helicopter defined by claim 1, in which the electrical control system includes a manually actuated master switch and an automatically actuated micro switch.

5. The improvement in a helicopter defined by claim 1, in which the electrical control system includes a micro switch and the means for energizing the control system when the helicopter is in flight comprises micro switch actuating means automatically operated by the helicopter landing gear to close the switch when the helicopter is in flight and to open the switch when the helicopter is on the ground.

6. The improvement in a helicopter defined by claim 1, which includes a by-pass valve located between the gas generator and the auxiliary engine and connected to said generator and engine.

7. The improvement in a helicopter defined by claim 1, which includes a by-pass valve located between and connected to the gas generator and the auxiliary engine, and in which the electrical control system is connected to a source of electrical energy and to the auxiliary engine gas generator and the by-pass valve.

8. The improvement in a helicopter defined by claim 1, in which the means automatically activating the igniter when the r.p.m. of the rotor falls below a predetermined limit is an r.p.m. selector switch in the electrical control system.

9. The improvement in a helicopter defined by claim 8, in which the r.p.m. selector switch is actuated by centrifugally responsive mechanism mounted on the rotor shaft.

10. The improvement in a helicopter defined by claim 7, in which the by-pass valve is automatically opened when the rotor shaft r.p.m. exceeds a predetermined limit.

11. The improvement in a helicopter defined by claim 10, in which the by-pass valve is automatically opened by an r.p.m. selector switch which is actuated by centrifugally responsive mechanism mounted on the rotor shaft.

12. A helicopter provided with means for safely landing the helicopter in the event of primary power failure, comprising
 (a) a transmission,
 (b) a transmission driving shaft,
 (c) a rotor,
 (d) a rotor shaft on which the rotor and the transmission are mounted,
 (e) an auxiliary engine provided with a gas generator and igniter,
 (f) gearing operatively connecting the auxiliary engine and the transmission driving shaft,
 (g) an electrical control system connected to a source of electrical energy and to the auxiliary engine gas generator igniter, said system including a manually actuated switch, an automatically actuated switch which is closed when the helicopter is in flight, lights which indicate switch status, a warning light which indicates low r.p.m. of the rotor shaft, and an r.p.m. selector switch which automatically closes when the r.p.m. of the rotor shaft reaches a predetermined low speed,
 (h) mechanism associated with the helicopter landing gear for closing said automatically actuated switch when the helicopter is in flight, and
 (i) mechanism controlled by the speed of the rotor shaft for automatically closing the r.p.m. selector switch when the rotor shaft reaches a predetermined low speed.

13. The helicopter defined by claim 12 in which the auxiliary engine is a turbine powered by solid fuel of the propellant type having a predetermined burning time sufficient to give the pilot of the helicopter time to find a safe landing area in the event of primary power failure.

14. The helicopter defined by claim 12 in which the mechanism controlled by the speed of the rotor shaft for automatically closing the r.p.m. selector switch is mounted on the rotor shaft and is centrifugally responsive to the speed of the rotor shaft.

15. A helicopter provided with means for safely landing the helicopter in the event of primary power failure, comprising
 (a) a transmission,
 (b) a transmission driving shaft,
 (c) a rotor,
 (d) a rotor shaft on which the rotor and transmission are mounted,
 (e) an auxiliary turbine engine provided with a gas generator and igniter,
 (f) gearing operatively connecting the auxiliary engine and the transmission driving shaft,
 (g) an electrical control system connected to a source of electrical energy and to the auxiliary engine gas generator igniter,
 (h) means energizing the control system when the helicopter is in flight,
 (i) means automatically activating the igniter when the r.p.m. of the rotor falls below a predetermined limit to thereby cause the auxiliary engine to transmit rotary motion to the transmission driving shaft, and
 (j) a valve controlling the input of gas to the turbine engine, said valve having a gas passageway extending in one direction into the turbine for normal operation and a second passageway extending in the opposite direction into the turbine for throttling the engine when the r.p.m. of the rotor shaft exceeds a predetermined limit.

No references cited.

MILTON BUCHLER, *Primary Examiner.*

A. E. CORRIGAN, *Assistant Examiner.*